United States Patent
Dees et al.

(10) Patent No.: US 10,088,869 B2
(45) Date of Patent: Oct. 2, 2018

(54) WIRELESS DOCKING SYSTEM

(71) Applicant: KONINKLIJKE PHILIPS N.V., Eindhoven (NL)

(72) Inventors: Walter Dees, Eindhoven (NL); Vincentius Paulus Buil, Veldhoven (NL); Lucas Jacobus Franciscus Geurts, Noord Brabant (NL); Mirjam Van Laarhoven, Eindhoven (NL)

(73) Assignee: KONINKLIJKE PHILISP N.V., Eindhoven (NL)

( * ) Notice: Subject to any disclaimer, the term of this patent is extended or adjusted under 35 U.S.C. 154(b) by 0 days.

(21) Appl. No.: 15/556,372

(22) PCT Filed: Feb. 25, 2016

(86) PCT No.: PCT/EP2016/053900
§ 371 (c)(1),
(2) Date: Sep. 7, 2017

(87) PCT Pub. No.: WO2016/142175
PCT Pub. Date: Sep. 15, 2016

(65) Prior Publication Data
US 2018/0107246 A1    Apr. 19, 2018

(30) Foreign Application Priority Data

Mar. 10, 2015   (EP) .................................... 15158456

(51) Int. Cl.
*H04M 1/66*    (2006.01)
*G06F 1/16*    (2006.01)
(Continued)

(52) U.S. Cl.
CPC ............. *G06F 1/1632* (2013.01); *H04B 7/26* (2013.01); *H04M 1/7253* (2013.01); *H04W 4/50* (2018.02); *H04W 4/60* (2018.02); *H04W 12/08* (2013.01)

(58) Field of Classification Search
CPC .................................................... G06F 1/1632
(Continued)

(56) References Cited

U.S. PATENT DOCUMENTS

| 2013/0309973 A1 | 11/2013 | Ravendran |
| 2014/0146745 A1 | 5/2014 | Huang |

FOREIGN PATENT DOCUMENTS

| WO | WO2012117306 A1 | 9/2012 |
| WO | WO2014189661 A1 | 11/2014 |

OTHER PUBLICATIONS

Bluetooth Specification, Core Package, version 2.1+ EDR, Jul. 26, 2007.

*Primary Examiner* — Joel Ajayi
(74) *Attorney, Agent, or Firm* — Larry Liberchuk

(57) ABSTRACT

A host is arranged for providing a wireless docking environment having peripherals (250) for docking via a wireless link (230) with a dockee (220) for establishing a docking session for enabling the dockee to use the peripheral. The host is arranged for, at a first moment, storing docking configuration data which defines monitoring a peripheral on behalf of the dockee. The host monitors the selected peripheral to acquire monitor data in a period, in which period the dockee is not docked with the host. Later, when establishing a docking session at second moment, the host sets a docking configuration in dependence of the docking configuration data and makes available the monitor data. The dockee (220)

(Continued)

is arranged for, when establishing the docking session, using the second docking configuration and accessing the monitor data.

12 Claims, 4 Drawing Sheets

(51) Int. Cl.
  *H04W 4/50* (2018.01)
  *H04W 4/60* (2018.01)
  *H04W 12/08* (2009.01)
  *H04B 7/26* (2006.01)
  *H04M 1/725* (2006.01)
(58) Field of Classification Search
  USPC .......................................................... 455/411
  See application file for complete search history.

WIRELESS DOCKING SYSTEM

FIELD OF THE INVENTION

The invention relates to a wireless docking system comprising a host and at least one dockee, the host arranged for accommodating at least one wireless docking environment comprising at least one peripheral, the dockee comprising a dockee communication unit for wireless communication, a dockee processor coupled to the dockee communication unit and arranged for, via the dockee communication unit, docking with the host for establishing a docking session for enabling the dockee to use the peripheral, the host comprising a host communication unit for wireless communication, a host processor coupled to the host communication unit and arranged for, via the host communication unit, docking with the dockee for establishing the docking session.

The invention further relates to a dockee, to a host, a host method, a dockee method, and a computer program product for wireless docking between a host and a dockee.

The invention relates to the field of wireless communication, e.g. via Wi-Fi, and more specific to docking of a (mobile) wireless dockee device (further called MD or dockee) to a wireless docking host device (further called WDH or host) providing a wireless docking environment comprising one or more peripherals.

BACKGROUND OF THE INVENTION

A host may have one or more built in peripherals, and/or may be arranged for coupling to one or more external peripherals. The set of peripherals is made available in the wireless docking environment to enable access to the peripherals that are locally connected through wire or wirelessly to the host through a set of general message exchange protocols via wireless communication. A host may also be a further mobile device having available one or more peripherals for a dockee.

In this context peripherals may be external devices like a display, keyboard, or mouse, or more complex devices like a heart monitor in a hospital. Peripherals may also be built in a host like a microphone or camera. For example, a TV may be also a host, i.e. the host is built in the TV and constitutes a host in combination with a number of peripherals such as the display, user control elements and audio output units. Accessing and/or using such peripherals and/or any other internal or external resources of the host may be called using peripheral services by the dockee as provided by a host via the wireless docking environment.

Host devices can offer access to their peripherals to provide all kinds of services via wireless communication such as Wi-Fi (as described in IEEE802.11). Such a set of peripherals and services may be called a wireless docking environment accommodated by a host. The wireless docking environment may include services such as video rendering, audio recording, detecting the presence of a person, using a USB device such as a keyboard or a mouse over Wi-Fi, etc. A host can 'advertise' these peripheral services over Wi-Fi, such that it is possible for other devices with a Wi-Fi radio to see what Wi-Fi peripherals are available in their vicinity. A Wi-Fi device may also ask ('probe') another Wi-Fi device about which Wi-Fi peripheral services it has to offer. Wi-Fi offers various ways to do such pre-association discovery.

Wireless docking is known, for example, from WO 2012/117306A1. A wireless docking station enables a wireless secured communication between at least one slave device and a master device.

The wireless docking host may provide information about its presence through a Wi-Fi beacon that dockees can use to select and initiate connections with a chosen host.

Applications running on the mobile device can make use of the peripherals once the portable device is docked with the host and enable the user to interact with these applications through the peripherals. In addition to input or output peripherals, also sensors may be available as peripherals, such as temperature sensor, blood pressure sensor, heart rate sensor, air quality sensor, presence sensor, etc., and could be included as part of a wireless docking environment. Such sensors can be used by the applications of the portable device to monitor the environment and adapt the behavior within these application based on the values provided by these sensors.

US2014/0146745 describes dockee centric wireless docking in a wireless docking system.

US2013/0309973 describes a system and method for persistent wireless docking.

WO2014/189661 describes a wireless docking architecture.

SUMMARY OF THE INVENTION

The user of a Wi-Fi device may select a wireless docking environment offering one or more services and may try to connect with it to access a peripheral. Making such a connection and selection takes time, several seconds up to several tens of seconds, and usually requires user intervention, such as reading a PIN code of the device to connect to and entering it in their own device.

Moreover, once the dockee undocks, the docking session is terminated and connections with the peripherals are lost. The host may then make these peripherals available again for other dockees to use. Typically the peripherals will be reset to their original initial state (e.g. blank screen, USB device enumeration relinquished, etc.) to let a subsequent dockee to start afresh.

The above situation has the following problems. When the undocked dockee docks again, there is no data on what happened during the time it was undocked. Also it may again take a relatively long time before the applications have identified and captured the context of the wireless docking environment and have connected and adapted to the current situation. This may not be desirable in e.g. a medical emergency context where every second counts.

It is an object of the invention to provide a system for wireless docking that enables docking and capturing a current situation quickly while reducing the effort required for initializing the docking session.

For this purpose, according to a first aspect of the invention, a host for use in the wireless docking system as described in the opening paragraph, comprises a host processor arranged for, at a first moment, storing docking configuration data defining a first docking configuration for the dockee, the first docking configuration comprising at least one peripheral selected from the wireless docking environment and the docking configuration data further defining monitoring of the selected peripheral, for monitoring the selected peripheral according to the docking configuration data to acquire monitor data of the selected peripheral in a period after the first moment, in which period the dockee is not docked with the host, and for, when establishing the docking session at a second moment after the period, using a second docking configuration in dependence of the docking configuration data and making available the monitor data inside the second docking configuration.

For this purpose, a dockee for use in said wireless docking system is arranged for wireless docking with the above host for using a peripheral and comprises a dockee processor arranged for, when establishing the docking session, using the second docking configuration and accessing the monitor data.

For this purpose, a host method of wireless docking is provided for use in a host in the above wireless docking system, the host method comprising at a first moment, storing docking configuration data defining a first docking configuration for the dockee, the first docking configuration comprising at least one peripheral selected from the wireless docking environment and the docking configuration data defining further monitoring of the selected peripheral, monitoring the selected peripheral according to the docking configuration data to acquire monitor data of the selected peripheral in a period after the first moment, in which period the dockee is not docked with the host, and, when establishing the docking session at a second moment after the period, using a second docking configuration in dependence of the docking configuration data and making available the monitor data inside the second docking configuration.

For this purpose, a dockee method of wireless communication is provided for use in a dockee in the above wireless docking system, the dockee method comprising, when establishing the docking session, using the second docking configuration and accessing the monitor data.

The methods according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer. In an embodiment, the computer program comprises computer program code means adapted to perform all the steps of a method according to the invention when the computer program is run on a computer. The computer program may be embodied on a computer readable medium.

Wireless docking means wirelessly connecting the dockee and the host for using, by the dockee, of a peripheral or peripheral service provided by the host within a wireless docking environment, while initiating a docking session means initiating the connection setup with the host for use of one or more of the peripherals.

The measures have the effect that wireless communication for docking is set up as follows. At a first moment a first docking configuration for the dockee is determined, for example while the dockee is initially docked and sends configuration instructions to the host. The host then stores docking configuration data defining the first docking configuration for the dockee The first docking configuration comprises at least one peripheral selected from the wireless docking environment. Also the docking configuration data defines monitoring of the selected peripheral, for example the peripheral that is being used during said initial docking.

Subsequently in a period in which the dockee is not docked with the host, the host will monitor the selected peripheral to acquire monitor data of the selected peripheral. Later, when establishing a docking session at a second moment after the period, a second docking configuration is used by the host in dependence of the docking configuration data. Using involves providing to the dockee the peripherals and/or peripheral functions as defined in the docking configuration data, and using parameters and credentials from the docking configuration data to set the peripherals to the required operational mode, activate respective functions, etc. The host makes the monitor data available inside the second docking configuration. The second docking configuration may effectively be equal to the first docking configuration, the only difference being that the monitor data is made available. For example the second docking configuration has the same set of peripherals and respective peripherals are set to the same status so as to resume a session that has been terminated earlier. Also the second docking configuration may be different from the first docking configuration, e.g. by having a different set of peripherals as selected based on the monitor data. For example an additional peripheral may be offered when specific monitor data has been detected. In the dockee the dockee processor is arranged for, when establishing the docking session, using the second docking configuration and accessing the monitor data. Advantageously, the dockee is now enabled to retrieve and use monitor data of the peripheral acquired during the period that the dockee is not docked. So, without even being present, the dockee can use the selected peripheral and peripheral functions to obtain data during said period and/or have the docking configuration adapted to the obtained data.

Optionally, in the host in the above wireless docking system, the host processor is arranged for said monitoring the selected peripheral to acquire as the monitor data at least one of data on state changes of the peripheral;

data on events sensed by the peripheral;

data on measurements performed by the peripheral;

audio data as captured by the peripheral;

video data as captured by the peripheral.

Advantageously various types of monitored data are made available for use by the dockee Optionally, in the host in the above wireless docking system, the host processor is arranged for for determining at least part of the docking configuration data when the dockee is docked with the host in a first docking session using the first docking configuration and for said using the second docking configuration when the dockee is docked in a second docking session; and/or the dockee processor is arranged for determining at least part of the docking configuration data when the dockee is docked with the host in a first docking session using the first docking configuration, and for said accessing the monitor data when the dockee is docked with the host in a second docking session using the second docking configuration. Advantageously the docking configuration data is determined during the first docking session, while enabling using the second docking configuration in the second docking session.

Optionally, in the above wireless docking system, the docking configuration data comprises at least one of
- a set of peripherals to be offered to the dockee in the docking session;
- a set of peripherals as used by the dockee in a preceding docking session;
- a power state setting of at least one peripheral;
- at least one setting value to be used for at least one peripheral in the docking session;
- at least one application to be launched on the dockee in the docking session;
- at least one setting value to be used in the dockee in the docking session;
- priorities of respective, different peripherals in the docking session;
- priorities of processes and/or applications running on the dockee in the docking session.

Advantageously, the arrangement and/or setting of the peripherals are included in the docking configuration data and are enabled to be used in the second docking configuration.

Optionally, in the above wireless docking system, the docking configuration comprises data at least one of
- priorities of the dockee with respect to other dockees for accessing the peripheral;
- a number of other dockees that is allowed to be docked during the docking session;
- rights of other dockees for docking and/or staying docked during the docking session;
- rights of other dockees for accessing the monitor data during the docking session;
- rights of other dockees for accessing the monitor data when the dockee is not docked with the host. Advantageously, the arrangement and/or rights of the respective dockee and further dockees are included in the docking configuration data and are enabled to be used in the second docking configuration.

Optionally, in the host in the above wireless docking system, the host processor is arranged to adapt the docking configuration data based on the monitor data.

Furthermore, the host processor may be arranged, based on the monitor data, to at least one of
- define monitoring of at least one peripheral of the wireless docking environment;
- activate or deactivate at least one peripheral of the wireless docking environment;
- control at least one peripheral of the wireless docking environment to perform a peripheral function. Advantageously, the docking configuration itself, and/or the control and/or monitoring of peripherals in the docking configuration, are adapted based on the monitor data as acquired.

Optionally, in the host in the above wireless docking system, the host processor is arranged for receiving monitoring instructions from the dockee, the monitoring instructions defining monitoring by defining at least one of
- a peripheral that must be monitored;
- specific monitor data that is to be acquired;
- at least one criterion and/or condition for analyzing the monitor data;
- a peripheral function to be performed based on specific monitor data if so acquired.

Also, in the dockee in the above wireless docking system, the dockee processor may be arranged for providing the monitoring instructions and transmitting the monitoring instructions to the host. Advantageously, the monitoring in the docking configuration is controlled by the dockee via the monitoring instructions.

Optionally, in the host in the above wireless docking system, the host processor is arranged to invite the dockee to dock based on the monitor data. Correspondingly, the dockee processor is arranged to be invited, e.g. based on a dedicated invitation message. Advantageously the host is enabled to respond to specific monitor data by actively initiating a docking session.

Further preferred embodiments of devices and methods according to the invention are given in the dependent claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

In this document wireless docking is about enabling mobile devices (so called dockees, wireless dockees or MDs) to wirelessly connect to a host providing services via peripherals, e.g. by making available peripherals that are built in and/or coupled to the host, so that applications on the mobile device can make use of these peripherals to improve the experience and productivity of working/interacting with these applications. A discovery/advertisement of services, and managing the connections to peripherals, is performed by a so-called wireless docking host (WDH or host), which makes functionality available through a wireless docking protocol.

Possible dockees include (but are not limited to) mobile phones, laptops, tablets, portable media players, cameras, electronic watches. Possible WDHs include (but are not limited to) dedicated wireless docking station devices, display devices, audio devices, printers, PCs. The wireless docking host may also be a small (PC like) dongle with a display, USB and audio interface. Possible peripherals include (but are not limited to) mice, keyboards, display devices, audio devices, webcams, printers, storage devices, USB hubs, network interfaces. These peripherals may be wireless and may support standards such as Wi-Fi Serial Bus and Wi-Fi Miracast to make their functionality available through the wireless network to other devices such as dockees and WDHs. Wired peripherals may be connected to the wireless host (e.g. USB, HDMI, DVI, VGA, analogue audio, analogue video, etc). Next to services providing access to peripherals, other services may include e.g. providing remote desktop access or access to certain applications, database access (e.g. document archive), network file system access, access to internet and specific internet services, home network services such as DLNA or UPnP services, etc.

Typically, the dockee device and the host device each comprise a microprocessor (not shown) which executes appropriate software stored at the device; for example, that software may have been downloaded and/or stored in a corresponding memory, e.g., a volatile memory such as RAM or a non-volatile memory such as Flash (not shown). The devices may also be equipped with microprocessors and memories (not shown). Alternatively, the devices may, in whole or in part, be implemented in programmable logic, e.g., as field-programmable gate array (FPGA). Dockee and host devices may be implemented, in whole or in part, as a so-called application-specific integrated circuit (ASIC), i.e. an integrated circuit (IC) customized for their particular use.

Also, the functions and units as described below may be implemented at least partly in hardware circuits, which may include a processor circuit and storage circuit, the processor circuit executing instructions represented electronically in the storage circuits.

Figure 1:
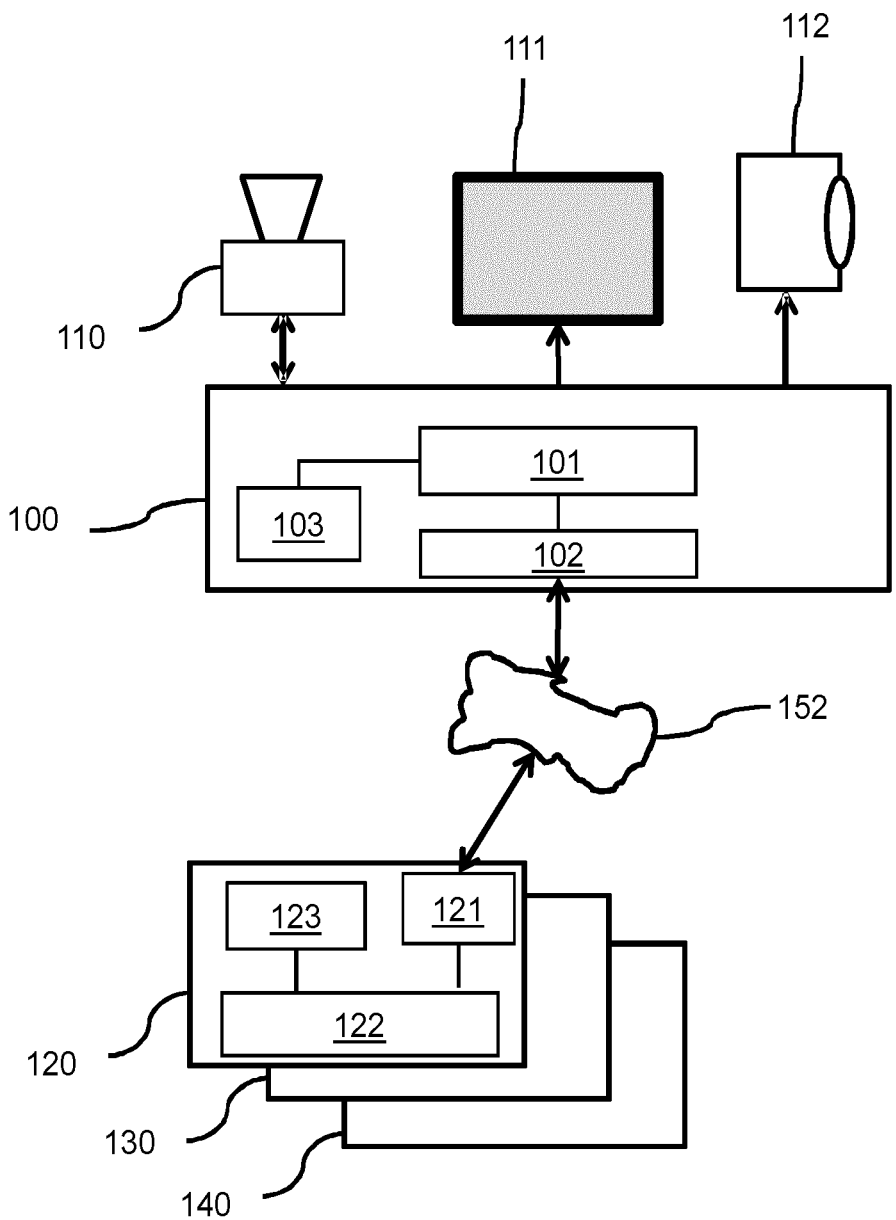
FIG. 1 shows a wireless docking system.

FIG. 1 shows a wireless docking system. The system includes a host device 100 arranged for wireless communication with one or more portable devices called dockees 120,130,140, for example mobile phones, laptops or tablet computers. Only the first dockee 120 is described in detail below, but further dockees have similar components and functions. The host device is coupled to a number of peripherals 110,111,112 to provide services, e.g. rendering audio or video (AV) data. It is noted that in this document AV data is used for any type of video data, audio data or a combination of video and audio data. The peripherals may include video output devices like a beamer or a display 111, graphical input/output devices like a smartboard or a touch screen, audio output devices like a loudspeaker system or a headphone, and further input/output devices like a mouse or a room control unit. The peripherals may also include input devices like sensors, for example a microphone 110 or a room temperature sensor, a blood pressure measuring device or a camera 112.

The host device 100 has a host communication unit 102 for accommodating wireless communication 152, for example a Wi-Fi unit, well known as such. The host device further has a host processor 101 arranged for docking at least one dockee. The process of docking a wireless device to a wireless docking host (WDH) is a process of establishing a data link via the available radio channel such as Wi-Fi or Bluetooth, and is known as such, for example as discussed above with reference to WO 2012/117306A1. A description of Bluetooth can be found, for example, in Bluetooth Specification, Core Package version 2.1+EDR, issued: 26 Jul. 2007. The docking process involves providing access to one or more services for the dockee.

The dockee 120 has a dockee communication unit 121 for accommodating said wireless communication with the host. In practice, there may be multiple communication units for that purpose, for example Bluetooth, Wi-Fi and 60 GHz (e.g. WiGig). The dockee further has a dockee processor 122 arranged for docking with the host device for, as a dockee, getting access to the at least one service.

In wireless docking, the host makes a number of services available to a dockee in a docking session. Any group of peripheral devices and/or services made available by a wireless docking host is called a wireless docking environment. A wireless docking environment may contain a single host and multiple peripherals, or a wireless docking host may accommodate a number of (different) wireless docking environments. There may also be a number of wireless docking hosts in reach of a mobile device to dock with. In the current document, any device in combination with peripherals providing wireless docking host functionality that provides access to the peripheral input and/or output functions is called a wireless docking environment accommodating peripherals.

Traditionally the above mentioned devices may employ Wi-Fi communication to make their wireless docking environment or their function wirelessly available, e.g. by using Wi-Fi Direct. Setting up a Wi-Fi connection requires quite some steps to be taken and the exchange of a number of messages before the two devices are 'associated' over Wi-Fi. This may require quite some user involvement to make sure that the correct devices are going to be connected and takes time during which the user has to wait for the connection to be set up and started. When two devices are associated over Wi-Fi, their Wi-Fi connection is protected cryptographically and an IP connection is established.

Wi-Fi devices can make themselves discoverable wirelessly. This can be done before two devices are associated, so this is called pre-association discovery. There are several types of pre-association discovery. One is pre-association device discovery, whereby a device and some properties of the devices like its name, function, etc. can be discovered. This may be done through beacon frames and probe request frames and probe response frames, well known from IEEE 802.11. Another type is pre-association service discovery, with which the services, e.g. printing, display, etc., offered by a Wi-Fi device can be discovered through IEEE 802.11u Generic Advertisement Service (GAS) frames by others. Such discovery may include information about wireless docking environments being offered for wireless docking.

Applications running on the portable device can make use of the peripherals that are accommodated by the host in the wireless docking environment once the portable device is docked, which enables the user to interact with these applications through the peripherals (e.g. write an E-mail within an E-mail app on a mobile phone, using a full-fledged keyboard, mouse and large screen display). Next to I/O peripherals, also sensors, such as temperature sensor, blood pressure sensor, heart rate sensor, air quality sensor, presence sensor, etc., based on technologies such as Bluetooth/Bluetooth Low Energy, Zigbee, 6LowPAN, 802.11ah, etc, could be included as part of a wireless docking system. These sensors can be used by the applications of the portable device to monitor the environment and adapt the behaviour within these application based on the values provided by these sensors.

Once the portable device undocks, any sessions and connections with the peripherals and sensors are terminated. The host can then make these peripherals available again for other dockees to use. Typically the peripherals will be reset to their original initial state (e.g. blank screen, USB device enumeration relinquished, etc.) to let a subsequent dockee to start afresh. When the undocked portable device docks again, it basically has no idea what happened during the time it was undocked. It may recover state information based on what the portable device had stored when it got undocked, and any new values it can read out from the sensors. Not only may information be lacking, it may also take longer time before the applications have identified/captured the new context and or have adapted to the new situation. This may not be desirable in e.g. a medical emergency context where every second counts.

In the host in the above docking system the host processor 101 is arranged for, at a first moment, storing docking configuration data defining a first docking configuration for the dockee, the first docking configuration comprising at least one peripheral selected from the wireless docking environment and the docking configuration data further defining monitoring of the selected peripheral. Thereto the host may have a host memory 103 for storing the docking configuration data. The first moment may be when a dockee is docked in an initial docking session, or may be during a dedicated configuration phase controlled via the host. The respective docking configuration data for the specific dockee defines at least one peripheral selected from the wireless docking environment, which peripheral is to be monitored on behalf of the dockee. Also, a docking configuration may be defined for a group of dockees, i.e. any member of the group of dockees being enabled to use the docking configuration as defined by the docking configuration data. For example, credentials or identity data may be shared amongst the members of the group to enable the host to retrieve the respective docking configuration data, and activate the corresponding docking configuration.

Furthermore, the host processor is arranged for monitoring the selected peripheral to acquire monitor data of the selected peripheral in a period after the first moment, in which period the dockee is not docked with the host. Monitoring may involve receiving data from the selected peripheral and subsequently storing the acquired monitoring data in the host memory 103. In further embodiments the monitoring data may be processed by the host and/or, according to predefined conditions, further functions may be activated as described in detail below. The period may be a predefined period in time, or continuously until the respective dockee is docked, up to a predefined time-out, etc.

Furthermore, the host processor is arranged for, when establishing the docking session at second moment after the period, using a second docking configuration in dependence of the docking configuration data and making available the monitor data inside the second docking configuration. The second moment occurs when the dockee docks and the host processor finds that the respective docking configuration data is available for the respective dockee and can be retrieved. As the docking configuration data already comprises communication configuration data defining the docking session fewer messages need to be exchanged between host and dockee for establishing the docking session. Moreover, the monitor data that has been acquired when the dockee was not docked is now made available for the dockee.

In the dockee in the above docking system, the dockee processor 122 is arranged for establishing a docking configuration when docking to the host. Part of the docking configuration data may be stored in a dockee memory 123. The dockee processor 122 is arranged for, when establishing the docking session at the seconds moment, using the second docking configuration as provided by the host. Using the already configured second docking configuration means that at least part of the protocol for establishing a docking session need not be performed. Subsequently the dockee is enabled to access the monitor data in the host within the second docking configuration. The dockee may use the monitor data, e.g. in an application running at the dockee. For example, specific applications present in the dockee may retrieve the monitor data and use the data of the period before the present docking session, and use the data as if the peripheral had been accessible directly before the start of the present docking session.

In an embodiment of the wireless docking system, the host processor 101 is arranged for configuring the docking configuration when the dockee is docked with the host in a first docking session. At least part of the first docking configuration data is now determined and stored. The host processor is arranged for later, when the dockee is docked in a second docking session, using the second docking configuration. Hence the second docking configuration is made active in dependence of the docking configuration data. For example, in the second docking configuration the peripherals may be set to resume the same status as the first docking configuration, while making available the monitor data for the dockee. Also, the dockee processor may be arranged for determining at least part of first the docking configuration data when the dockee is docked with the host in a first docking session, and for said accessing the monitor data when the dockee is docked with the host in a second docking session. For example, docking configuration parameters and credentials may be automatically derived from the actual parameters and credentials during the first docking session, e.g. the peripherals that have been selected and used by the dockee, and respective credentials generated and exchanged during the first docking session. Such docking configuration data may be stored when the dockee undocks and terminates the first docking session. Subsequently, when the same dockee later returns and docks again for the second docking session, the host detects the identity of the dockee and that respective docking configuration data, e.g. said parameters and credentials, have been stored earlier for the respective dockee. For example the dockee may provide a dockee identity or user identity so as to enable retrieving the respective docking configuration data for said identity.

Optionally, the host processor is arranged for said monitoring the selected peripheral to acquire data on state changes of the peripheral as the monitor data. For example, the state changes may be power on and power off changes, or any power state of a peripheral being docked with, e.g. low power mode or standby. Time stamps may be stored with the respective state changes.

Optionally, the host processor is arranged for said monitoring the selected peripheral to acquire data on events sensed by the peripheral. For example, the peripheral may detect the presence of people in a room or operating space, or may recognize a face or voice of a user.

Optionally, the host processor is arranged for said monitoring the selected peripheral to acquire data on measurements performed by the peripheral. For example, the peripheral may be a sensor that measures room temperature on predetermined or configurable intervals.

Optionally, the host processor is arranged for said monitoring the selected peripheral to acquire audio data as captured by the peripheral. For example, the peripheral may be a microphone and the audio data may be a recording of sound during a predetermined period before the current time.

Optionally, the host processor is arranged for said monitoring the selected peripheral to acquire video data as captured by the peripheral. For example, a peripheral may be a video camera and the monitoring may be set to acquire a video sequence when activity is detected in a room.

In an embodiment of the wireless docking system the docking configuration data may comprise a set of peripherals to be offered to the dockee in the docking session, i.e. the docking session that will be established when the dockee is docking based on the retrieved docking configuration data. For example, a set of peripherals may be predefined at the host or may be configured by an application at the dockee earlier. Furthermore, the respective docking configuration may comprise a set of peripherals as used by the dockee in a preceding docking session. Such a set may be stored automatically when the dockee undocks. Furthermore, the respective docking configuration may comprise a power state setting of at least one peripheral. For example, a specific peripheral may need to be powered for the respective dockee. This may be indicated in the docking configuration. When retrieving the respective docking configuration, the host checks the power status of that peripheral, and, if necessary, switches on the peripheral.

Furthermore, the docking configuration data may comprise one or more setting values to be used for one or more peripherals in the docking session. For example, a display resolution may be part of the docking configuration, and may be retrieved and applied when the respective dockee docks. Furthermore, the respective docking configuration may comprise one or more applications that are to be launched on the dockee in the next docking session. For example, a specific application may be started when entering a baby room where sound has been monitored. Furthermore, the respective docking configuration may comprise one or more setting values to be used in the dockee in the next docking session.

In an embodiment, the docking configuration data may comprise priorities of respective, different peripherals in the next docking session. Monitor data of peripherals of a higher priority may be presented and transmitted first. Furthermore, the respective docking configuration may comprise priorities of processes and/or applications running on the dockee in the next docking session. The dockee may receive, when docking, such information to update or adapt the processes and applications according to the received priorities.

In an embodiment, the docking configuration data may comprise priorities of the respective dockee with respect to other dockees for accessing the peripheral. For example, where different dockees may be expected to be docked simultaneously, a specific dockee may have priority over other dockees to display messages on a display peripheral. Furthermore, the respective docking configuration data may comprise a number of other dockees that is allowed to be docked during the docking session. Furthermore, the respective docking configuration data may comprise rights of other dockees for docking and/or staying docked during the docking session. Such data enables a dockee to prevent other dockees to dock, or limit rights to access peripherals for other dockees, so as to ensure that specific peripherals are available for use. Also, the respective docking configuration data may comprise rights of other dockees for accessing the monitor data during the docking session, and/or rights of other dockees for accessing the monitor data when the dockee is not docked with the host. By defining such rights the dockee may control the access of other dockees to the monitor data that has been acquired for the specific dockee.

In an embodiment of the wireless docking system, the host processor is arranged to adapt the of the docking configuration data based on the monitor data. For example, when the monitor data of a smoke detector shows that smoke is detected, the docking configuration may be extended by adding an audio output peripheral such as a loudspeaker system so as to enable alerting other people.

In an embodiment of the wireless docking system, the docking configuration data comprises a set of peripherals, and the host processor is arranged, based on the monitor data, define monitoring of at least one peripheral of the wireless docking environment. For example, when the monitor data of a heart rate detector indicate a deviating heart rate, an audio and/or video peripheral may be activated to record audiovisual data. Furthermore, the host processor may be arranged, based on the monitor data, to activate or deactivate at least one peripheral of the wireless docking environment, and/or to control at least one peripheral of the wireless docking environment to perform a peripheral function. Various examples are discussed below.

In an embodiment of the wireless docking system, the host processor is arranged for receiving monitoring instructions from the dockee. Correspondingly, the dockee processor is arranged for transmitting the monitoring instructions to the host. Various monitoring instructions may define, for example, a peripheral that must be monitored, specific monitor data that is to be acquired, at least one criterion and/or condition for analyzing the monitor data, a peripheral function to be performed based on specific monitor data if so acquired, etc. Also one or more of the other configuration parameters and/or credentials that have been described above may be controlled, or adapted, based on respective monitoring instructions. The dockee processor may correspondingly be arranged for providing the monitoring instructions and transmitting the monitoring instructions to the host.

In an embodiment of the wireless docking system, the host processor may be arranged to invite a dockee to dock based on the monitor data. For example, when a specific peripheral that is monitored measures a predefined value, and the host processor detects that the predefined value is present, the host may specifically transmit a message to initiate docking by the dockee for which the monitoring was defined. Also the dockee processor may be arranged to be invited, e.g. start docking based on a dedicated invitation message, while skipping elements of the docking process that are already available from the docking configuration data. Also, the host processor may be arranged to invite some other dockee to dock based on the monitor data. For example, in the docking configuration data it may be define that a specific other dockee is to be invited on the condition that specific monitor data are detected.

Figure 2:
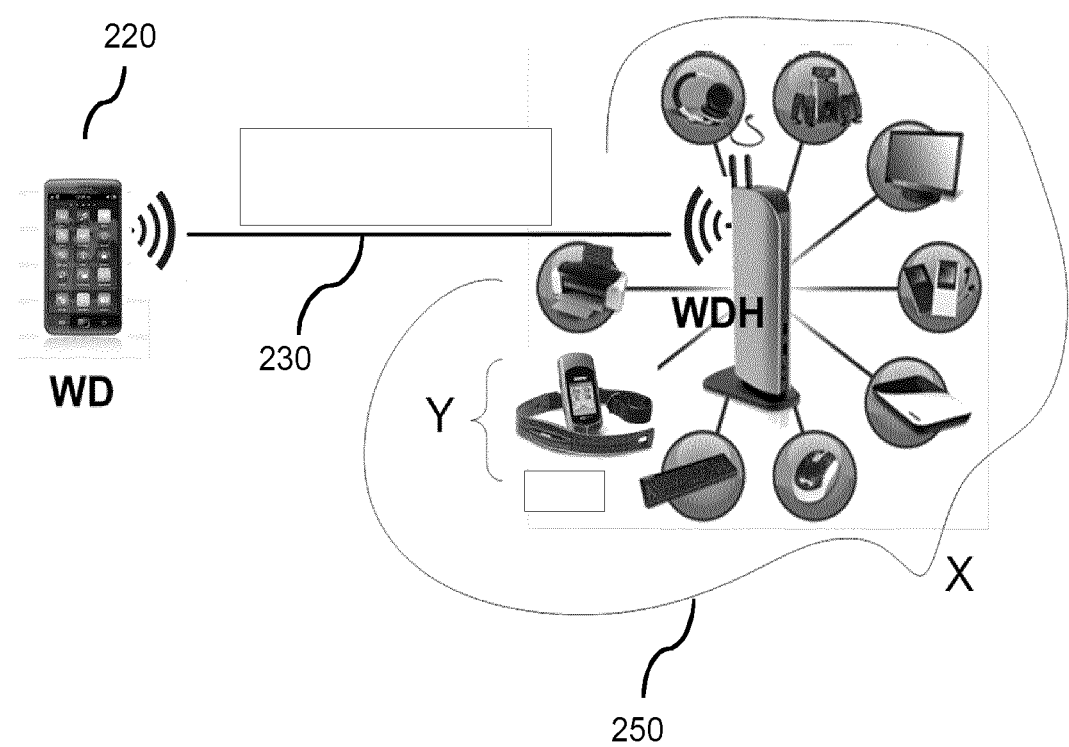
FIG. 2 shows an example of a dockee having a wireless link to a host accommodating peripherals.

FIG. 2 shows an example of a dockee having a wireless link to a host accommodating peripherals. A dockee 220 labeled WD is depicted as a mobile phone having multiple applications represented by icons on a touch screen display. The dockee has a wireless docking link 230 to a host labeled WDH which is coupled to a set of multiple peripherals schematically grouped by a line 250 and the set of peripherals labeled X. Within the set X there is a peripheral subset labeled Y, for example a heart rate sensor or a baby monitor device. The subset Y is selected by the dockee to be monitored during absence of the dockee. In the example the wireless docking host is attached and configured to offer the set X of peripherals for docking to the wireless dockee over a wireless connection. The wireless docking host further configured to monitor state changes, events or other data called monitor data received from a subset Y of peripherals when the wireless dockee is not docked with the wireless docking host. When the wireless dockee docks to the wireless docking host, the wireless docking host provides information to the wireless dockee about the monitor data received from the peripherals during said monitoring. So, based on the monitor data, in effect the docking configuration is different from the docking configuration at the time the wireless dockee previously undocked from the wireless docking host. The difference may be the presence of the monitor data itself, and/or changes applied to the configuration based on the monitor data by the host processor. Such changes may be according to preconfigured criteria or as instructed by the dockee in a preceding docking session.

A number of practical examples are discussed now, referring to the host by WDH and to portable devices supporting the function of dockee as WD. For example, the docking configuration as denoted above may include:
- the set of peripherals being offered by the WDH to dock with;
- the set of peripherals selected by the WD to dock with;
- any configurable power state of a peripheral being docked with (e.g. switch on/off, standby);
- any configurable parameter value chosen to be used for a peripheral being docked with (e.g. display resolution, volume level, colour, brightness, etc.);
- applications to be launched on the WD when it gets docked with the WDH;
- configurable settings on the WD related to docking;
- priorities of the peripherals being docked (e.g. order in which device drivers are loaded/momentiated, or the order in which devices are being enumerated/configured);
- priorities of processes/applications running on a WD related to docking;
- priorities of who gets access to which peripherals (in case of multiple WDs);
- specific WDs are allowed to dock (e.g. automatically undock users with less privileges);
- a number of WDs that can be docked simultaneously.

Such a docking system enables a faster docking procedure for the user, leading to a docking configuration that is most desirable in a certain situation faster and with less user interaction. This is very useful in cases where time is crucial, such as medical or other emergencies, where the WD may e.g. only show the nurse/doctor the most relevant information that is required in a particular situation. Next to the time aspect, there are other benefits to adapting the docking based on the events that have happened in the absence of the WD. For example, in a baby room, a WD may dock differently when the baby is not there versus when the baby is there and sleeping, e.g. switch on light automatically when baby is not present versus not switching on the light when in the meantime the baby's presence/sleep state is detected.

In a further embodiment of the system as above, the wireless docking host is configured to invite a wireless dockee to dock based on the monitor data, e.g. when a specific state change/event is detected by the wireless docking host by monitoring the set Y of peripherals. Such a system reduces the amount of user interaction required to dock, e.g. when something important happened, such as in the case of a medical emergency. The WDH may monitor a patient with several sensors, e.g. heart rate sensor, temperature sensor, blood oxygen level sensor. Normally the WD is not docked, but the host sends an invitation message to the WD requesting the WD to dock when the sensor values exceed certain threshold values. In addition, or alternatively, the WDH may power on and offer additional peripherals to dock with (e.g. defibrillator) based on detecting specific monitor data.

In a practical embodiment, similar to the system depicted in FIG. 2, the WDH offers a set X of peripherals for the WD to dock with through a wireless docking link, e.g. a Wi-Fi P2P connection running the wireless docking messaging protocol. Upon docking, the WD will typically start a docking application through which the user can select all peripherals or a subset of peripherals to dock with. The WD will load the device drivers to operate these peripherals and configure them according to the WD's or WD user's preferences. The WD can use these peripherals within any of its applications, e.g. to use the large display to show the screen, use the mouse for user input, and monitor a sensor, e.g. gather data from heart rate sensor. In the system the docking configuration defines the combined state of the configurable parameters for docking on the WD, e.g. set of peripherals selected to use during docking, how these peripherals are configured, credentials, etc., and the docking status of the WDH, e.g. number of WD's docked simultaneously, power state of attached peripherals, etc.

In an embodiment the WD instructs the WDH which peripherals to monitor. This can be done using a special message in the wireless docking messaging protocol, or can be done using a dedicated configuration process, e.g. by accessing an HTML page offered by the WDH to configure its settings. The WDH monitors the peripherals in set Y and registers incoming monitor data during the time that the WD is not connected with the WDH (called undocked), and stores this information, for example on non-volatile storage such as a HDD, Flash memory, SD-card, USB flash drive, NFS network drive, cloud storage, or in volatile memory such as SDRAM or Mobile DDR. The information may be stored as originally received or may be condensed (e.g. store only subset of the information). The information may also be interpreted by the WDH, for example so that only the most relevant state changes/events/data are stored. The frequency with which the peripherals are accessed to read out the state information/data may be adjusted by the WDH depending on the peripheral, the WD or the time since the WD was docked. The WDH may stop monitoring or stop storing information for the peripherals in set Y after a certain maximum time is reached since the WD was docked for the last time. The WDH may also extend the set Y of monitored peripherals when certain conditions are met during the time that the WD is undocked. For example, when the health status of patient is declining, it may be useful to involve (and possibly start up) extra monitoring equipment such that all relevant information is available as soon as the WD is docked. The set of peripherals may also be extended or reduced due to other reasons during the time that the WD is undocked, e.g. speakers might be taken away or added to the system, or new wireless monitoring equipment is added.

In an embodiment, based on the monitor information, the WDH and/or the WD change the respective docking configuration the next time the WD docks with the WDH. The trigger to make these adjustments to the docking configuration is based on whether the monitored information meets certain criteria, e.g. when a value read/received from a monitored peripheral is above or below a certain threshold, when a particular state change is detected within the peripheral (e.g. peripheral switched on/off), or when a particular event is triggered by operating the peripheral (e.g. certain key combination entered on a keyboard). The WD and/or WDH may also operate a set of rules to determine what should happen e.g. when a specific sequence of events or state changes happens.

Various examples of criteria, triggers or rules can be configured in the WDH. If the criteria are met and/or rules are applied, then upon docking of the WD for which the peripherals in set Y were monitored, the WDH will operate a changed docking configuration. For example, it may change the set of peripherals for the WD to dock with (e.g. offer a different list of peripherals or different list of wireless docking environments in pre- and post-association messages), switch on/off certain peripherals that the WD can dock with, undock another WD to enable the WD for which the peripherals were monitored to access its desired peripherals. To this end, the WDH will need to detect if it is the same WD for which it was configured to monitor peripherals in set Y. This can be done by comparing a device identifier received from the WD with a previously stored identifier for that WD. Such identifier can e.g. be the P2P Device/MAC address of the WD in a Wi-Fi Association/Authentication request frame, Wi-Fi P2P GO negotiation frame, or can e.g. be a unique identifier sent as part of a wireless docking protocol message, ASP coordination protocol message, Wi-Fi Miracast protocol message, MA-USB protocol message.

Other examples of criteria, triggers or rules can be configured in the WD. As such, the dockee may store at least part of the docking configuration so as to enable using and/or resuming the use of peripherals and monitor data according to the stored configuration data. Upon docking the WD will retrieve the monitor data for the peripherals in set Y that were monitored, and if the criteria are met and/or rules are applied, the WD subsequently may operate a changed docking configuration. For example, it may select a different set of peripherals to dock with, it may launch a different set of applications, it may set configurable peripheral parameters to a different value (e.g. display resolution, volume level, colour, brightness, etc.), it may load device drivers and enumerate/configure the peripherals in a different order, it may set different priorities to the processes/applications related to docking, etc.

In the above examples the WD will need to fetch the monitoring information from the WDH. This can be achieved for example through certain messages being exchanged over the wireless docking link between the WD and WDH (post-association). Alternatively, the monitoring information is made available by the WDH through pre-association service discovery (e.g. using P2P GAS frame exchange). The result is that the respective docking configuration of the WD and WDH is different from the docking configuration that the WD and WDH were operating at the time just before the WD previously got undocked from the WDH. Effectively, when docking a next time, the docking session reaches a desired operating state faster and with less user interaction steps.

Optionally in the above described system, the WDH invites to dock when the monitored state information/events/data from the peripherals in set Y reach a certain (threshold) value. This can be done for example through push notifications, E-mail, SMS/MMS, Whatsapp/Twitter message, HTTP server push/long polling, additional field in Wi-Fi beacon/probe request/response frames, Wi-Fi Provision Discovery/Association/Authentication Request, UPnP GENA/multicast events, etc.

Optionally in the above described system, the WD instructs the WDH how to interpret the data received from the peripherals Y. This can be done using particular messages in the wireless docking protocol, or the WD can e.g. send an application or script to the WDH that the WDH can interpret and run (e.g. Android/iOS app, Java applet, Javascript, Python script, Windows executable, CS-Script, VBScript, . . . ). This may include instructions on frequency of logging, which filters to apply, which events to trigger upon receiving certain data from the peripherals (e.g. if value received is above a certain threshold), instructions on activating/operating peripherals, instructions what to do when a certain state change is detected or a certain event is received from the peripheral, for example invite a WD to dock.

Additionally, or alternatively, the WD may instruct the WDH to upload the monitored state changes/events/data from the peripherals Y to a specific URL. This URL may point to an external server on the Intranet/Internet or may e.g. point to the WD itself. The information can be sent through HTTP, FTP, Bittorrent or other data transfer protocol. The external server may be responsible for storing the monitored information and for applying the criteria that act as a trigger for inviting a WD to dock or to change the docking configuration on the WDC and/or WD may be configured on the external server.

Optionally in the above described system, the WDH may prevent certain peripherals from being part of the peripherals in set Y selected to be monitored, e.g. for privacy reasons. For example, it may disallow a specific WD to log events coming in through the keyboard whilst it is absent to prevent the WD to gain access to privacy sensitive information from other WD's being docked in the meantime.

Optionally, the docking configuration as denoted above may include the set of peripherals being offered by the WDH to dock with. This enables various scenarios. A first possible scenario is a baby room where certain peripherals such as a lamp or lullaby generator are offered to dock with when baby is not sleeping, but not offered when baby is sleeping at the moment of docking (based on e.g. state of presence sensor, sleep sensor). The monitoring data may include how the baby was sleeping for the last hour, not only the current moment. A further scenario is a hospital, where certain instruments, such as a saline fluid pump or medicine administrator injection pump or defibrillator or pacemaker or alarm are offered to dock with depending on the state of the patient at the moment of docking (based on e.g. state of blood pressure sensor, heart rate sensor, temperature sensor, etc. A further scenario is a living room, where certain peripherals, such as TV or audio device are offered or not offered to dock with depending if someone else is in the room or which activity is detected at the moment of docking (based on e.g. state of presence sensor, noise/activity detector). A further scenario is an office, whereby either speakers or wireless headphones are offered to dock depending whether or not anyone else is in an office room (based on e.g. state of presence/occupancy sensor, noise/activity detector). A further scenario is a kitchen, where certain peripherals, such as the oven are offered to dock with depending on the state of the peripherals or food items used within a recipe (e.g. temperature of water in water boiler, internal temperature of meat not completely defrozen) at the moment of docking (based on e.g. state of temperature sensor).

Optionally, the docking configuration as denoted above may include the set of peripherals selected by the WD to dock with. This enables a scenario similar to the set of peripherals offered by the WDH, but now from point of view from WD which can take a value/reading from a peripheral into account when selecting a set of peripherals to dock with.

Optionally, the docking configuration as denoted above may include a configurable power state of a peripheral being docked with (e.g. switch on/off, standby). A first scenario is a home/living room, where certain lamps are switched on/off, or are set to a dimmed/fully operational state during docking depending who else is present in a room or which activities have been detected when getting docked. A further scenario is a home/living room, where certain peripherals remain in standby mode during docking (i.e. not automatically switched on) if during the day the maximum daily limit for energy usage (as configured by user) has almost been reached. A further scenario is a kitchen, where certain peripherals such as microwave, water boiler, electrical stove, fan operate at a lower power state depending on recipe.

Optionally, the docking configuration as denoted above may include a configurable parameter value chosen to be used for a peripheral being docked with (e.g. display resolution, volume level, colour, brightness, etc.). A first enabled scenario is a home or living room, where temperature in rooms when docking with thermostat and/or state of air conditioning and/or air purifier and/or state of blinds, is automatically configured differently e.g. depending on who is present in which room at the moment of docking, depending on outside weather (sunny/cloudy), or depending on energy usage of the day (based on e.g. state of temperature sensors, light sensors, presence sensors, air quality sensor). A further scenario is an office, where brightness of screen when docking with monitor, is automatically configured differently depending on e.g. brightness within room, outside weather (sunny/cloudy), circadian rhythm of person (getting sleepy or being wide awake). A further Scenario is a hospital, where speed of a saline fluid pump or medicine administrator injection pump are configured differently when docking, based on e.g. monitored state of patient.

Optionally, the docking configuration as denoted above may include the set of applications being launched on the WD when it gets docked with the WDH. A first enabled scenario is a hospital, where a different application/task list may get launched on WD, depending on e.g. state of patient. A further scenario is a baby room, where a different application/guide may get launched on WD, depending on e.g. wet diaper, baby crying, baby on changing mat, baby in bed.

Optionally, the docking configuration as denoted above may include configurable settings on the WD related to docking. A first enabled scenario is a home or living room, where person may simply dock to all peripherals in case no one else is present and get a user input to select peripherals individually when someone else is present.

Optionally, the docking configuration as denoted above may include priorities of the peripherals being docked (e.g. order in which device drivers are loaded/momentiated, or the order in which devices are being enumerated/configured). A first enabled scenario is a hospital, where the most important equipment for a particular situation/emergency is enumerated first, based on the state of the patient.

Optionally, the docking configuration as denoted above may include priorities of processes/applications running on a WD related to docking. A enabled is a hospital, where processes/applications on WD related to a particular situation/emergency get highest priority, based on state of patient. The docking configuration may further include priorities of who gets access to which peripherals (in case of multiple WDs). An enabled scenario is a hospital, where the doctor gets access to the most important peripherals, whereas nurse may get less important peripherals. The docking configuration may further include data on which WDs are allowed to dock (e.g. automatically undock users with less privileges). A first enabled scenario is a hospital, where the doctor gets access to the peripherals, undocking and/or blocking access to the WD of a nurse. A further scenario is a home or living room, where child cannot dock with e.g. TV and media hard drive, if parents are not present.

Optionally, the docking configuration as denoted above may include a number of WDs that can be docked simultaneously. An enabled scenario is a hospital, where a doctor and nurse cannot dock simultaneously in case of emergency, but can dock simultaneously otherwise, depending on state of patient.

Figure 3:
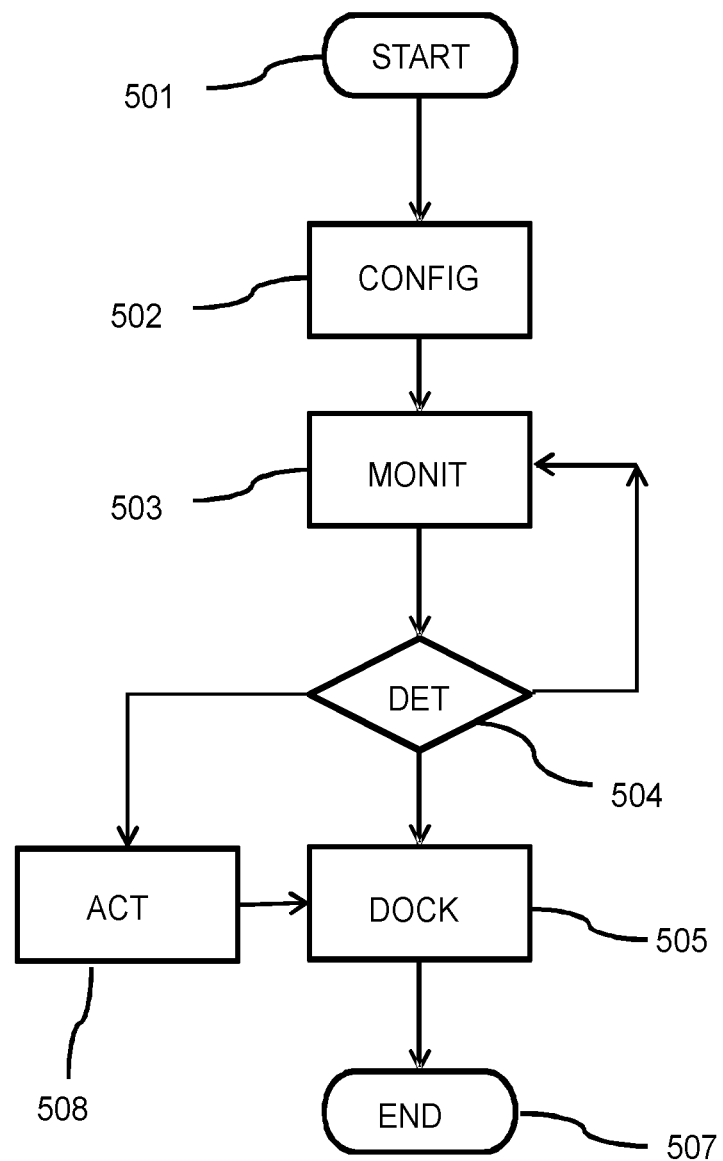
FIG. 3 shows a method of wireless docking for use in a host.

FIG. 3 shows a method of wireless docking for use in a host. The host method enables wireless communication and docking between a host and a dockee. The host and the dockee have been elucidated with reference to FIGS. 1 and 2. The host is arranged for accommodating at least one wireless docking environment comprising at least one peripheral. The host method initially starts at START 501 at a first moment. In next step CONFIG 502 docking configuration data for the dockee are determined and stored. The respective docking configuration data defines at least one peripheral selected from the wireless docking environment, and monitoring a selected peripheral on behalf of the dockee. In a next step MONIT 503, the selected peripheral is monitored to acquire monitor data of the selected peripheral in a period after the first moment. In this monitoring period the dockee is not docked with the host.

In an optional step DET 504 specific values or conditions are detected in the monitor data. If such values or conditions are detected, the method may continue at step ACT 508 in which the docking configuration may be adapted or additional functions may be triggered as described above.

The method continues the monitoring process until the period has expired, or via said optional steps. Next, at step DOCK 505 at a second moment, the dockee initiates a docking session and a docking session is established. In the docking session the host method sets a second docking configuration in dependence of the docking configuration data and makes available the monitor data inside the second docking configuration. The method ends at node END 507.

Figure 4:
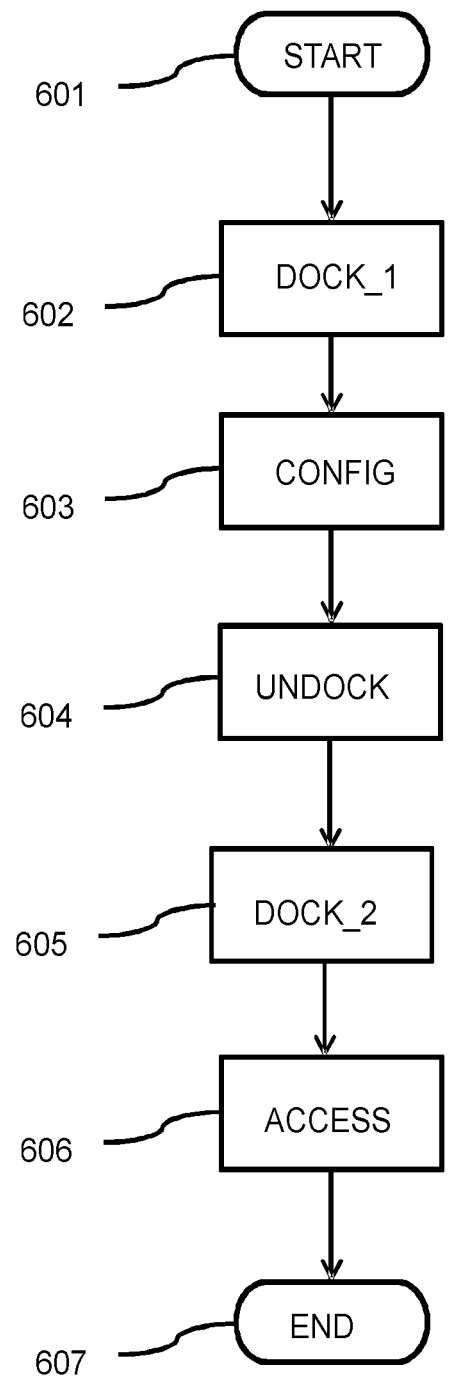
FIG. 4 shows a method of wireless docking for use in a dockee.

FIG. 4 shows a method of wireless docking for use in a dockee. The dockee method enables wireless communication and docking between a host and a dockee. The host and the dockee have been elucidated with reference to FIGS. 1 and 2. The host is arranged for accommodating at least one wireless docking environment comprising at least one peripheral. The dockee method initially starts at START 601 at a first moment. In an optional next step DOCK_1 602 the dockee may initially dock at the host. In optional next step CONFIG 603 a first docking configuration for the dockee is determined. Thereto the dockee may transmit configuration instructions to the host for defining monitoring of at least one peripheral. The monitoring as such has been elucidated above where describing the docking system with reference to FIGS. 1 and 2. The respective docking configuration defines at least one peripheral selected from the wireless docking environment.

Next, at optional step UNDOCK 604, the dockee terminates the initial docking session. Subsequently, during the time that the dockee is not docked, the host will monitor at least one peripheral, as elucidated with reference to FIG. 3.

Later, at step DOCK_2 605 at a second moment, the dockee initiates a further docking session and the docking session is established. In the docking session a second docking configuration is set by the host in dependence of the docking configuration data and the monitor data are made available in the respective docking configuration. In a next step ACCESS 606 the dockee method comprises accessing the monitor data in the respective docking configuration. The dockee may now use the monitor data. Finally the method terminates at node END 607.

In practice the methods may be implemented in host software (host method) and dockee software (dockee method), e.g. a so-called app. Such computer program products are for wireless docking between a host and a dockee, and comprise a program operative to cause a processor to perform the host or dockee method.

Although the invention has been mainly explained by embodiments using wireless docking, the invention is also suitable for any wireless communication system where a mobile device (having the dockee role) wants to connect to a further wireless devices (having the host role) to connect to, or share, one or more peripherals or services via the host, and the host has stores a docking configuration and monitors certain peripherals when the dockee is not docked. It is to be noted that the invention may be implemented in hardware and/or software, using programmable components. In practice, the invention may be applied in devices that offer their services over Wi-Fi, such as TVs, monitors, audio systems, printers, USB peripherals, wireless docking stations, etc. The dockee may be a mobile device such as a MP3 or MP4 player that wants to use renderers such as TVs, monitors, audio systems over Wi-Fi, and in fact any mobile device, smart phone, tablet, laptop, etc., that wants to use services over Wi-Fi (printing, docking, internet access, etc.).

It will be appreciated that the above description for clarity has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention may be implemented in any suitable form including hardware, software, firmware or any combination of these.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:

1. A host in a wireless docking system, comprising:
   a host communication unit for wireless communication; and
   a host processor coupled to the host communication unit and configured for docking with a dockee to establish a docking session, such that the dockee is enabled to use a peripheral in a wireless docking environment, the host processor being further configured for:
      storing docking configuration data defining a first docking configuration for the dockee at a first time period, the first docking configuration comprising the peripheral selected from the wireless docking environment;
      monitoring the selected peripheral according to the docking configuration data in order to acquire monitor data of the selected peripheral during a second time period after the first time period, wherein the dockee is not docked with the host during the second time period;
      using a second docking configuration according to the docking configuration data when establishing the docking session during a third time period after the second time period; and
      making the monitor data in the second docking configuration available to the dockee, such that the dockee is configured for using the second docking configuration and access the monitor data when establishing the docking session.

2. The host claimed in claim 1, wherein the host processor is configured for:
   determining at least part of the docking configuration data when the dockee is docked with the host in a first docking session using the first docking configuration and
   using the second docking configuration when the dockee is docked in a second docking session;
   and the dockee is configured
   for determining at least part of the docking configuration data when the dockee is docked with the host in the first docking session using the first docking configuration, and
   accessing the monitor data when the dockee is docked with the host in the second docking session using the second docking configuration.

3. The host as claimed in claim 1, wherein the docking configuration data comprises at least one of:
   a set of peripherals available to the dockee in the docking session;
   a set of peripherals used by the dockee in a preceding docking session;
   a power state setting of the peripheral;
   at least one setting value to be used for the peripheral in the docking session;
   at least one application to be launched on the dockee in the docking session;
   at least one setting value to be used in the dockee in the docking session;
   priorities of different peripherals in the docking session; and
   priorities of processes or applications running on the dockee in the docking session.

4. The host as claimed in claim 1, wherein the docking configuration data comprises at least one of:
   priorities of the dockee with respect to other dockees for accessing the peripheral;
   a number of other dockees that is allowed to be docked during the docking session;
   rights of other dockees for docking or staying docked during the docking session;
   rights of other dockees for accessing the monitor data during the docking session; and
   rights of other dockees for accessing the monitor data when the dockee is not docked with the host.

5. The host as claimed in claim 1, wherein the host processor is configured to adapt the docking configuration data based on the monitor data.

6. The host as claimed in claim 1, wherein host processor is configured, based on the monitor data, to perform acts comprising at least one of:
   define monitoring of the peripheral of the wireless docking environment;
   activate or deactivate the peripheral of the wireless docking environment; and
   control the peripheral of the wireless docking environment to perform a peripheral function.

7. The host as claimed in claim 1, wherein the host processor is configured for receiving monitoring instructions from the dockee, the monitoring instructions defining monitoring by defining at least one of:
   a peripheral that must be monitored;
   specific monitor data that is to be acquired;
   at least one criterion or a condition for analyzing the monitor data; and
   a peripheral function to be performed based on specific monitor data if so acquired;

wherein the dockee is configured for
providing the monitoring instructions and transmitting the monitoring instructions to the host.

8. The host as claimed in claim 1 wherein the host processor is configured to invite the dockee to dock based on the monitor data.

9. The host as claimed in claim 1, wherein the host processor is configured for monitoring the selected peripheral to acquire the monitor data that includes at least one of:
data on state changes of the peripheral;
data on events sensed by the peripheral;
data on measurements performed by the peripheral;
audio data captured by the peripheral; and
video data captured by the peripheral.

10. A wireless docking system, comprising:
a host comprising a host communication unit for wireless communication and a host processor coupled to the host communication unit; and
a dockee comprising a dockee communication unit for wireless communication and a dockee processor coupled to the dockee communication unit;
the host being configured for docking with the dockee to establish a docking session, such that the dockee is enabled to use a peripheral in a wireless docking environment, the host processor being configured for:
storing docking configuration data defining a first docking configuration for the dockee at a first time period, the first docking configuration comprising the peripheral selected from the wireless docking environment;
monitoring the selected peripheral according to the docking configuration data in order to acquire monitor data of the selected peripheral during a second time period after the first time period, wherein the dockee is not docked with the host during the second time period;
using a second docking configuration according to the docking configuration data when establishing the docking session during a third time period after the second time period; and
making the monitor data in the second docking configuration available to the dockee, such that the dockee is configured for using the second docking configuration and access the monitor data when establishing the docking session.

11. A method for wireless docking, comprising:
providing a host communication unit for wireless communication;
providing a host processor coupled to the host communication unit and configured for docking with a dockee to establish a docking session, such that the dockee is enabled to use a peripheral in a wireless docking environment;
storing docking configuration data defining a first docking configuration for the dockee at a first time period, the first docking configuration comprising the peripheral selected from the wireless docking environment;
monitoring the selected peripheral according to the docking configuration data in order to acquire monitor data of the selected peripheral during a second time period after the first time period, wherein the dockee is not docked with the host during the second time period;
using a second docking configuration according to the docking configuration data when establishing the docking session during a third time period after the second time period; and
making the monitor data in the second docking configuration available to the dockee, such that the dockee is configured for using the second docking configuration and access the monitor data when establishing the docking session.

12. A non-transitory computer-readable medium having one or more executable instructions stored thereon, which when executed by a processor, cause the processor to perform a method for wireless docking, the method comprising:
providing a host communication unit for wireless communication;
providing a host processor coupled to the host communication unit and configured for docking with a dockee to establish a docking session, such that the dockee is enabled to use a peripheral in a wireless docking environment;
storing docking configuration data defining a first docking configuration for the dockee at a first time period, the first docking configuration comprising the peripheral selected from the wireless docking environment;
monitoring the selected peripheral according to the docking configuration data in order to acquire monitor data of the selected peripheral during a second time period after the first time period, wherein the dockee is not docked with the host during the second time period;
using a second docking configuration according to the docking configuration data when establishing the docking session during a third time period after the second time period; and
making the monitor data in the second docking configuration available to the dockee, such that the dockee is configured for using the second docking configuration and access the monitor data when establishing the docking session.

* * * * *